United States Patent
Xu et al.

(10) Patent No.: US 8,760,128 B2
(45) Date of Patent: Jun. 24, 2014

(54) THREE-PHASE BOOST-BUCK POWER FACTOR CORRECTION CONVERTER

(75) Inventors: Ming Xu, Nanjing (CN); Chuanyun Wang, Nanjing (CN); Peng Mao, Nanjing (CN)

(73) Assignees: FSP Technology Inc., Taoyuan County (TW); FSP-Powerland Technology Inc., Nanjing (CN)

( * ) Notice: Subject to any disclaimer, the term of this patent is extended or adjusted under 35 U.S.C. 154(b) by 288 days.

(21) Appl. No.: 13/349,571

(22) Filed: Jan. 13, 2012

(65) Prior Publication Data

US 2012/0242299 A1   Sep. 27, 2012

(30) Foreign Application Priority Data

Mar. 24, 2011   (CN) .......................... 2011 1 0071620

(51) Int. Cl.
*G05F 1/00*   (2006.01)

(52) U.S. Cl.
USPC ............. 323/222; 323/207; 323/256; 363/89; 363/90; 363/101; 363/126; 363/127

(58) Field of Classification Search
USPC ........... 363/34, 35, 36, 37, 65, 67, 68, 69, 70, 363/71, 72, 81, 82, 84, 87, 88, 89, 90, 97, 363/123, 126, 127, 101; 323/205, 207, 210, 323/222, 223, 224, 259, 265, 266
See application file for complete search history.

(56) References Cited

U.S. PATENT DOCUMENTS

| | | | | |
|---|---|---|---|---|
| 2008/0112200 A1* | 5/2008 | Tan et al. | ....................... | 363/101 |
| 2009/0179494 A1* | 7/2009 | Song | ............................... | 307/66 |
| 2009/0268496 A1* | 10/2009 | Tan et al. | ...................... | 363/126 |

* cited by examiner

*Primary Examiner* — Nguyen Tran
(74) *Attorney, Agent, or Firm* — Jianq Chyun IP Office

(57) ABSTRACT

A three-phase boost-buck PFC converter including three independent single-phase boost-buck PFC circuits respectively is provided, which are capable of performing PFC on each phase of the three-phase power. The single-phase boost-buck PFC circuit is composed of two single-phase boost-buck converters independently working in a positive and a negative half cycle of an input voltage, and the two single-phase boost-buck converters are connected in parallel at an input side, and are connected in series at an output side, and each of the single-phase boost-buck converters is composed of a front-end boost circuit and a back-end buck circuit connected in cascade. Compared to the existing technique, regardless of a boost mode or a buck mode, the conduction loss is effectively reduced, and the whole system efficiency is effectively improved.

14 Claims, 17 Drawing Sheets

(a)

(b)

(a)

(b)

(a)

(b)

THREE-PHASE BOOST-BUCK POWER FACTOR CORRECTION CONVERTER

CROSS-REFERENCE TO RELATED APPLICATION

This application claims the priority benefit of China application serial no. 201110071620.0, filed Mar. 24, 2011. The entirety of the above-mentioned patent application is hereby incorporated by reference herein and made a part of this specification.

BACKGROUND OF THE INVENTION

1. Field of the Invention

The invention relates to a three-phase boost-buck power factor correction (PFC) converter. Particularly, the invention relates to a converter using three independent single-phase boost-buck PFC circuits.

2. Description of Related Art

In the past two decades, power electronic technology has been rapidly developed, and various power electronic devices are widely used in chemical industry and communications, etc., in which a rectifier is a most typical one. The conventional rectifiers include diode rectifiers and phase-controlled rectifiers using thyristors. Using as a typical non-linear circuit, in operation, an input current of the rectifier contains a large amount of harmonic component, which may cause a severe harmonic pollution to the public utility grid. A power factor correction (PFC) converter can greatly reduce the harmonic component of the input current to achieve unit power factor rectification, which draws attentions of scholars from various nations.

Presently, a single-phase boost type PFC converter having a boost function is widely used. Such solution has advantages of simple circuit structure, continuous input current and small filter volume, etc., though an application scope thereof is limited, namely, it is only adapted to occasions when an output voltage is greater than an input voltage peak. In some cases, the output voltage is smaller than the input voltage peak, which means that within a fundamental cycle, the converter not only has a phase of working in a boost mode but also has a phase of working in a buck mode. Therefore, the PFC converter that can work in both of the boost mode and the buck mode has become one of the major subjects studied by scholars all over the world.

FIG. 1 is a circuit topology of a conventional single-phase boost-buck PFC converter. The converter can work in the buck mode or the boost mode by controlling the switches S1 or S2. When the switch S1 is constantly turned on and the switch S2 is in a pulse width modulation (PWM) switch working state, the converter is in the boost mode, and when the switch S2 is constantly turned off, and the switch S1 is in the PWM switch working state, the converter is in the buck mode. This circuit is a single-phase boost-buck converter which is only adapted to small power applications.

FIG. 2 is a circuit diagram of an existing two-stage three-phase boost-buck PFC converter. The converter is composed of a front-stage three-phase buck PFC converter and a back-stage boost circuit, which is a three-phase three-wire structure. The three-phase input currents of the circuit are coupled to each other, which is complicated in control, and is of no avail for reducing a total harmonic distortion (THD) of the input current.

FIG. 3 is a circuit diagram of an existing three-level three phase boost-buck PFC converter of a three-phase four-wire structure. Regarding each phase branch, a half branch is in a working state in either a positive or a negative half cycle of a supply voltage, and a working mode thereof (the buck or boost mode) is determined by a relationship between the input voltage and the output voltage. When a polarity of the phase voltage is positive, the upper branch of each phase branch is in the working state. Now, if the phase voltage is greater than the output voltage, the upper branch works in the buck mode. Otherwise, it works in the boost mode. When the polarity of the phase voltage is negative, the lower branch of each phase branch is in the working state. Now, if an absolute value of the phase voltage is greater than the output voltage, the lower branch works in the buck mode. Otherwise, it works in the boost mode. Such circuit effectively resolves the problems of narrow application scope and complicate control of the conventional technique, and avails reducing the total harmonic distortion of the circuit. However, according to the circuit topology, it is known that in the buck mode, two diodes have conduction loss at any time, though in the conventional buck PFC converter, only one diode has the conduction loss during a period when the switch is turned off. Therefore, when the circuit topology of FIG. 3 is used, the more proportion the buck mode occupies, the greater system loss caused by the diode conduction loss is, which may significantly reduce the system efficiency. In the boost mode, one diode has the conduction loss in an inductor energy storage phase, and two diodes have the conduction loss in a freewheeling phase, while in the conventional boost PFC converter, only one diode has the conduction loss in the freewheeling phase, so that efficiency of the converter is reduced.

SUMMARY OF THE INVENTION

The invention is directed to a three-phase boost-buck power factor correction (PFC) converter, which resolves a problem of large system loss of the conventional technique.

The invention provides a three-phase boost-buck PFC converter including a first, a second and a third single-phase boost-buck PFC circuits respectively receiving one-phase voltage of three-phase voltages, a first output capacitor, a second output capacitor and a neutral line; the first, the second and the third single-phase boost-buck PFC circuits respectively include a neutral point, an input terminal, a first output terminal and a second output terminal; one end of the first output capacitor is connected to the three neutral points, and another end is connected to the three first output terminals; one end of the second output capacitor is connected to the three neutral points, and another end is connected to the three second output terminals; the three neutral points are connected to the neutral line;

wherein the first, the second and the third single-phase boost-buck PFC circuits are respectively composed of two single-phase boost-buck converters independently working in a positive and a negative half cycle of an input voltage, and the two single-phase boost-buck converters are connected in parallel at an input side, and are connected in series at an output side, and each of the single-phase boost-buck converters is composed of a front-end boost circuit and a back-end buck circuit connected in cascade.

In a first exemplary implementation of the three-phase boost-buck PFC converter of the invention, each of the first, the second and the third single-phase boost-buck PFC circuits includes:

a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;

a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;

a first to a fourth inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the first output terminal, another end of the third inductor is connected to the first terminal of the third switch, one end of the fourth inductor is connected to the second output terminal, and another end of the fourth inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

The first inductor and the second inductor are magnetically coupled, so that the number of components in the circuit is reduced, and the circuit structure is more compact.

In a second exemplary implementation of the three-phase boost-buck PFC converter of the invention, each of the first, the second and the third single-phase boost-buck PFC circuits includes:

a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;

a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;

a first to a third inductors, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the first output terminal, another end of the second inductor is connected to the first terminal of the third switch, one end of the third inductor is connected to the second output terminal, and another end of the third inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

In a third exemplary implementation of the three-phase boost-buck PFC converter of the invention, each of the first, the second and the third single-phase boost-buck PFC circuits includes:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first to a third inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the neutral point, and another end of the third inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

Further, the first inductor and the second inductor are magnetically coupled.

In a fourth exemplary implementation of the three-phase boost-buck PFC converter of the invention, each of the first, the second and the third single-phase boost-buck PFC circuits includes:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first inductor and a second inductor, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the neutral point, another end of the second inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

The three-phase boost-buck PFC converter of the invention can be decoupled into three independent single-phase boost-buck PFC converters, so that according to the spirit of the invention, a single-phase boost-buck PFC converter is obtained, which includes:

a single-phase boost-buck PFC circuit, a first output capacitor, a second output capacitor and a neutral line; the single-phase boost-buck PFC circuit includes a neutral point, an input terminal, a first output terminal and a second output terminal; one end of the first output capacitor is connected to the neutral point, and another end is connected to the first output terminal; one end of the second output capacitor is connected to the neutral point, and another end is connected to the second output terminal; a second input terminal is connected to the neutral point;

wherein the single-phase boost-buck PFC circuit is composed of two single-phase boost-buck converters independently working in a positive and a negative half cycle of an input voltage, and the two single-phase boost-buck converters are connected in parallel at an input side, and are connected in series at an output side, and each of the single-phase boost-buck converters is composed of a front-end boost circuit and a back-end buck circuit connected in cascade.

In a first exemplary implementation of the single-phase boost-buck PFC converter of the invention, the single-phase boost-buck PFC circuit includes:

a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;

a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;

a first to a fourth inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the first output terminal, another end of the third inductor is connected to the first terminal of the third switch, one end of the fourth inductor is connected to the second output terminal, and another end of the fourth inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

Further, the first inductor and the second inductor are magnetically coupled.

In a second exemplary implementation of the single-phase boost-buck PFC converter of the invention, the single-phase boost-buck PFC circuit includes:

a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;

a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;

a first to a third inductors, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the first output terminal, another end of the second inductor is connected to the first terminal of the third switch, one end of the third inductor is connected to the second output terminal, and another end of the third inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

In a third exemplary implementation of the single-phase boost-buck PFC converter of the invention, the single-phase boost-buck PFC circuit includes:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first to a third inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the neutral point, and another end of the third inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

Further, the first inductor and the second inductor are magnetically coupled.

In a fourth exemplary implementation of the single-phase boost-buck PFC converter of the invention, the single-phase boost-buck PFC circuit includes:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first inductor and a second inductor, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the neutral point, another end of the second inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

The three-phase boost-buck PFC converter of the invention includes three independent single-phase boost-buck PFC circuits capable of performing power factor correction on each phase of the three-phase power. The single-phase boost-buck PFC circuit is composed of two single-phase boost-buck converters independently working in the positive and negative half cycles of the input voltage, and the two single-phase boost-buck converters are connected in parallel at an input side, and are connected in series at an output side, and each of the single-phase boost-buck converters is composed of a front-end boost circuit and a back-end buck circuit connected in cascade. Compared to the existing technique, regardless of the boost mode or the buck mode, the conduction loss is effectively reduced, and the whole system efficiency is effectively improved.

In order to make the aforementioned and other features and advantages of the invention comprehensible, several exemplary implementations accompanied with figures are described in detail below.

BRIEF DESCRIPTION OF THE DRAWINGS

The accompanying drawings are included to provide a further understanding of the invention, and are incorporated

DETAILED DESCRIPTION OF DISCLOSED EMBODIMENTS

Figure 1:
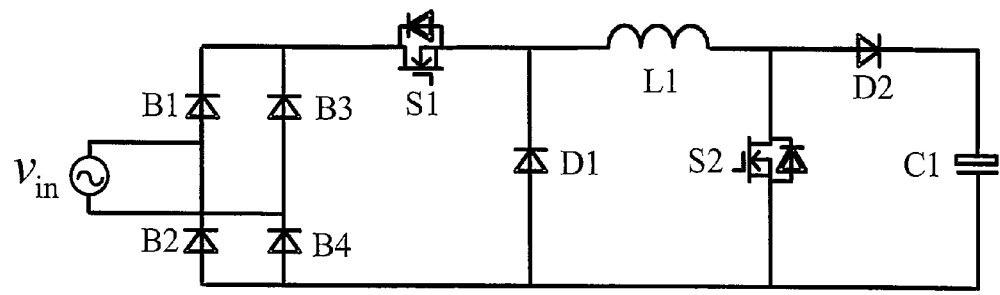
FIG. 1 is a circuit diagram of a conventional single-phase boost-buck power factor correction (PFC) converter.
Figure 2:
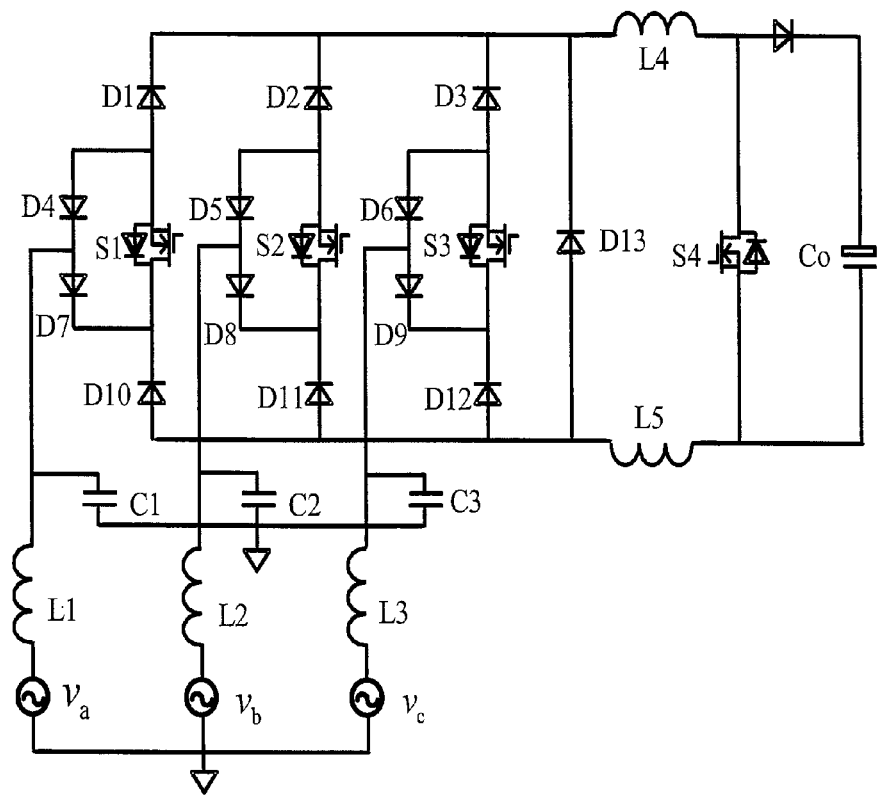
FIG. 2 is a circuit diagram of an existing two-stage three-phase boost-buck PFC converter.

The exemplary embodiments of the disclosure are illustrated in detail below with reference to the accompanying drawings. In addition, components/members of the same reference numerals are used to represent the same or similar parts in the accompanying drawings and implementations wherever it is possible.

Technical details of the invention are described below with reference of figures.

The three-phase boost-buck power factor correction (PFC) converter of the invention includes three independent single-phase boost-buck PFC circuits, and each of the single-phase boost-buck PFC circuits is composed of a front-end boost circuit and a back-end buck circuit connected in cascade.

Figure 4:
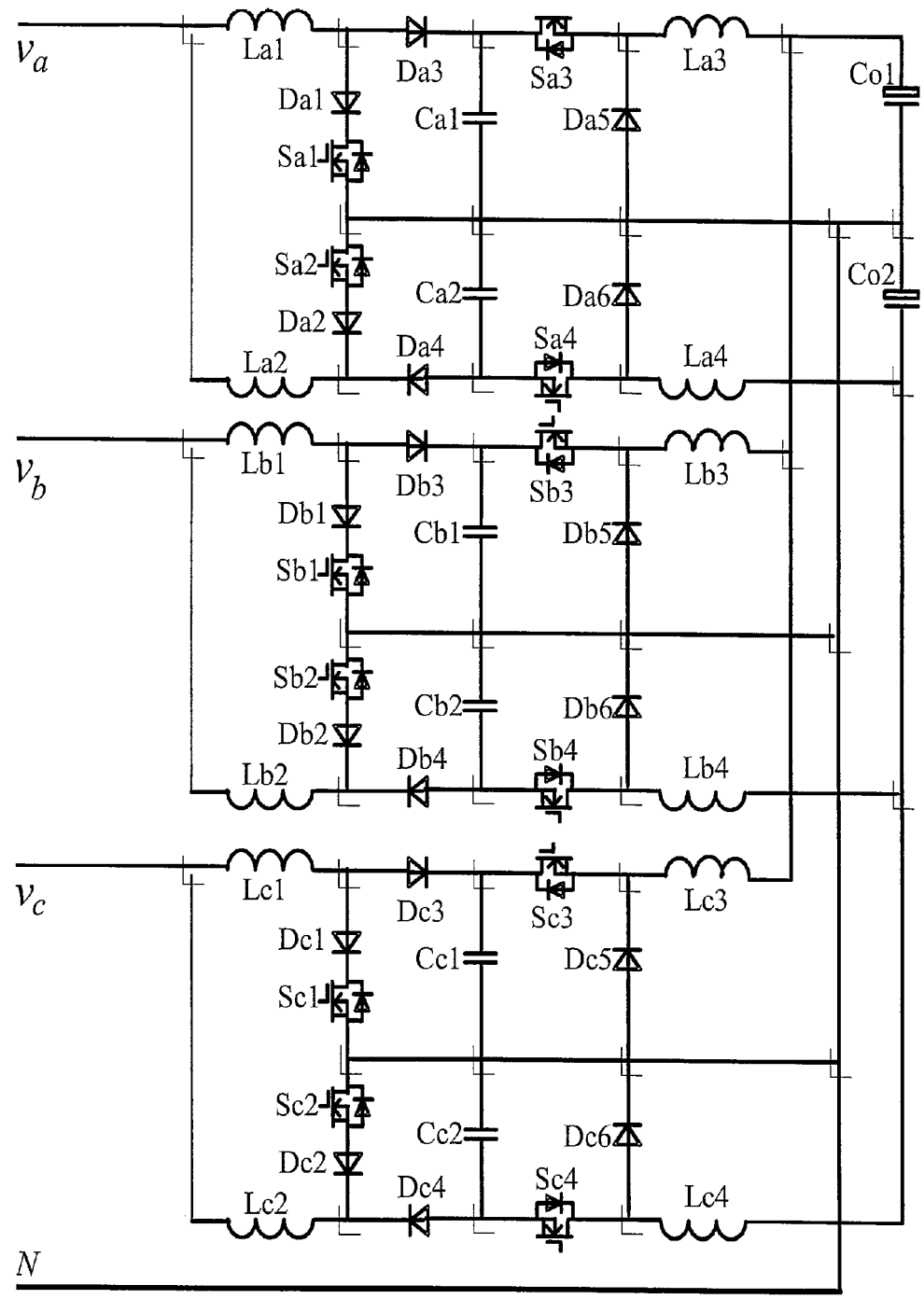
FIG. 4 is a circuit diagram of a first exemplary implementation of a three-phase boost-buck PFC converter of the invention.

In a first exemplary implementation of the three-phase boost-buck PFC converter of the invention, as shown in FIG. 4, it includes a first, a second and a third single-phase boost-buck PFC circuits respectively receiving one-phase voltage of three-phase voltages (Va, Vb and Vc), a first output capacitor Co1, a second output capacitor Co2 and a neutral line N. The first, the second and the third single-phase boost-buck PFC circuits respectively include a neutral point, an input terminal, a first output terminal and a second output terminal. One end of the first output capacitor Co1 is connected to the three neutral points, and another end is connected to the three first output terminals. One end of the second output capacitor Co2 is connected to the three neutral points, and another end is connected to the three second output terminals. The three neutral points are connected to the neutral line N. The three-phase boost-buck PFC converter further includes diodes Da1-Da6, Db1-Db6 and Dc1-Dc6, switches Sa1-Sa4, Sb1-Sb4 and Sc1-Sc4, inductors La1-La4, Lb1-Lb4 and Lc1-Lc4, and filter capacitors Ca1-Ca2, Cb1-Cb2 and Cc1-CC2, which are coupled in a manner as that shown in FIG. 4.

To be specific, the single-phase boost-buck PFC circuit receiving the phase voltage Va includes the diodes Da1-Da6, the switches Sa1-Sa4, the inductors La1-La4, and the filter capacitors Ca1-Ca2. An anode of the diode Da1 is connected to an anode of the diode Da3, a cathode of the diode Da2 is connected to a cathode of the diode Da4, and a cathode of the diode Da6 and an anode of the diode Da5 are connected to the neutral point. Each of the switches Sa1-Sa4 has a first terminal and a second terminal. The first terminal of the switch Sa1 and the second terminal of the switch Sa2 are connected to the neutral point. The second terminal of the switch Sa1 is connected to a cathode of the diode Da1, the first terminal of the switch Sa2 is connected to an anode of the diode Da2. The first terminal of the switch Sa3 is connected to a cathode of the diode Da5, the second terminal of the switch Sa3 is connected to a cathode of the diode Da3. The first terminal of the switch Sa4 is connected to an anode of the diode Da4, and the second terminal of the switch Sa4 is connected to an anode of the diode Da6. One end of the inductor La1 is connected to the input terminal, another end of the inductor La1 is connected to a connection line between the anodes of the diodes Da1 and Da3. One end of the inductor La2 is connected to the input terminal, another end of the inductor La2 is connected to a connection line between the cathodes of the diodes Da2 and Da4. One end of the inductor La3 is connected to the first output terminal, another end of the inductor La3 is connected to the first terminal of the switch Sa3. One end of the inductor La4 is connected to the second output terminal, and another end of the inductor La4 is connected to the second terminal of the switch Sa4. One end of the filter capacitor Ca1 is connected to a connection line between the second terminal of the switch Sa3 and the cathode of the diode Da3, another end of the filter capacitor Ca1 is connected to the neutral point. One end of the filter capacitor Ca2 is connected to a connection line between the first terminal of the switch Sa4 and the anode of the diode Da4, and another end of the filter capacitor Ca2 is connected to the neutral point.

In addition, the single-phase boost-buck PFC circuit receiving the phase voltage Vb includes the diodes Db1-Db6, the switches Sb1-Sb4, the inductors Lb1-Lb4, and the filter capacitors Cb1-Cb2. An anode of the diode Db1 is connected to an anode of the diode Db3, a cathode of the diode Db2 is connected to a cathode of the diode Db4, and a cathode of the diode Db6 and an anode of the diode Db5 are connected to the neutral point. Each of the switches Sb1-Sb4 has a first terminal and a second terminal. The first terminal of the switch Sb1 and the second terminal of the switch Sb2 are connected to the neutral point. The second terminal of the switch Sb1 is connected to a cathode of the diode Db1, the first terminal of the switch Sb2 is connected to an anode of the diode Db2. The first terminal of the switch Sb3 is connected to a cathode of the diode Db5, the second terminal of the switch Sb3 is connected to a cathode of the diode Db3. The first terminal of the switch Sb4 is connected to an anode of the diode Db4, and the second terminal of the switch Sb4 is connected to an anode of the diode Db6. One end of the inductor Lb1 is connected to the input terminal, another end of the inductor Lb1 is connected to a connection line between the anodes of the diodes Db1 and Db3. One end of the inductor Lb2 is connected to the input terminal, another end of the inductor Lb2 is connected to a connection line between the cathodes of the diodes Db2 and Db4. One end of the inductor Lb3 is connected to the first output terminal, another end of the inductor Lb3 is connected to the first terminal of the switch Sb3. One end of the inductor Lb4 is connected to the second output terminal, and another end of the inductor Lb4 is connected to the second terminal of the switch Sb4. One end of the filter capacitor Cb1 is connected to a connection line between the second terminal of the switch Sb3 and the cathode of the diode Db3, another end of the filter capacitor Cb1 is connected to the neutral point. One end of the filter capacitor Cb2 is connected to a connection line between the first terminal of the switch Sb4 and the anode of the diode Db4, and another end of the filter capacitor Cb2 is connected to the neutral point.

Furthermore, the single-phase boost-buck PFC circuit receiving the phase voltage Vc includes the diodes Dc1-Dc6, the switches Sc1-Sc4, the inductors Lc1-Lc4, and the filter capacitors Cc1-Cc2. An anode of the diode Dc1 is connected to an anode of the diode Dc3, a cathode of the diode Dc2 is connected to a cathode of the diode Dc4, and a cathode of the diode Dc6 and an anode of the diode Dc5 are connected to the neutral point. Each of the switches Sc1-Sc4 has a first terminal and a second terminal. The first terminal of the switch Sc1 and the second terminal of the switch Sc2 are connected to the neutral point. The second terminal of the switch Sc1 is connected to a cathode of the diode Dc1, the first terminal of the switch Sc2 is connected to an anode of the diode Dc2. The first terminal of the switch Sc3 is connected to a cathode of the diode Dc5, the second terminal of the switch Sc3 is connected to a cathode of the diode Dc3. The first terminal of the switch Sc4 is connected to an anode of the diode Dc4, and the second terminal of the switch Sc4 is connected to an anode of the diode Dc6. One end of the inductor Lc1 is connected to the input terminal, another end of the inductor Lc1 is connected to a connection line between the anodes of the diodes Dc1 and Dc3. One end of the inductor Lc2 is connected to the input terminal, another end of the inductor Lc2 is connected to a connection line between the cathodes of the diodes Dc2 and Dc4. One end of the inductor Lc3 is connected to the first output terminal, another end of the inductor Lc3 is connected to the first terminal of the switch Sc3. One end of the inductor Lc4 is connected to the second output terminal, and another end of the inductor Lc4 is connected to the second terminal of the switch Sc4. One end of the filter capacitor Cc1 is connected to a connection line between the second terminal of the switch Sc3 and the cathode of the diode Dc3, another end of the filter capacitor Cc1 is connected to the neutral point. One end of the filter capacitor Cc2 is connected to a connection line between the first terminal of the switch Sc4 and the anode of the diode Dc4, and another end of the filter capacitor Cc2 is connected to the neutral point.

Figure 5:
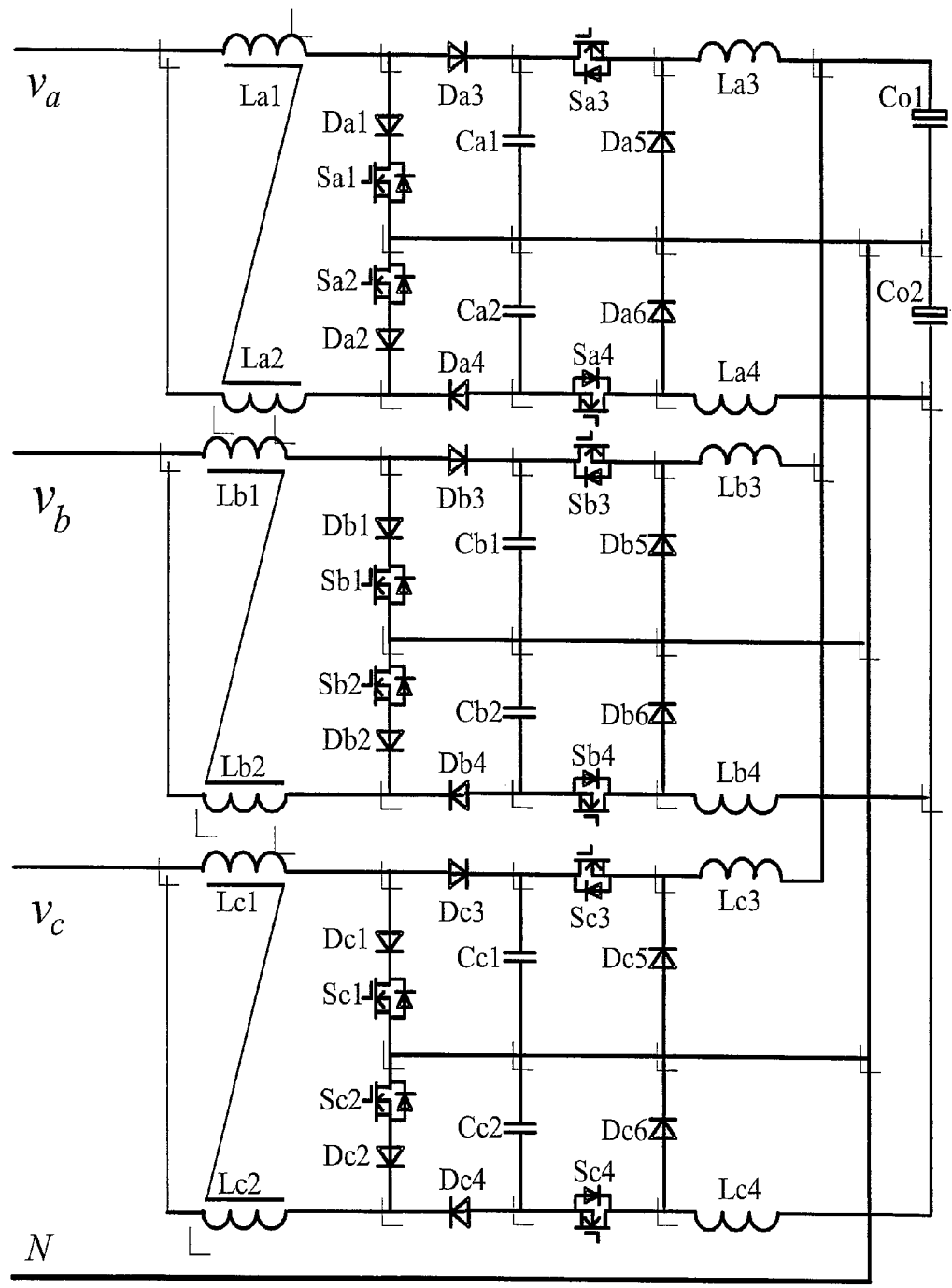
FIG. 5 is a circuit diagram of an improved implementation of the first exemplary implementation of a three-phase boost-buck PFC converter of the invention.

An improved implementation of the first exemplary implementation of the three-phase boost-buck PFC converter is as that shown in FIG. 5, in which the inductors La1 and La2, Lb1 and Lb2, Lc1 and Lc2 are magnetically coupled respectively, i.e. two inductors share a common magnetic core, and the other parts are the same to that shown in FIG. 4.

Figure 6:
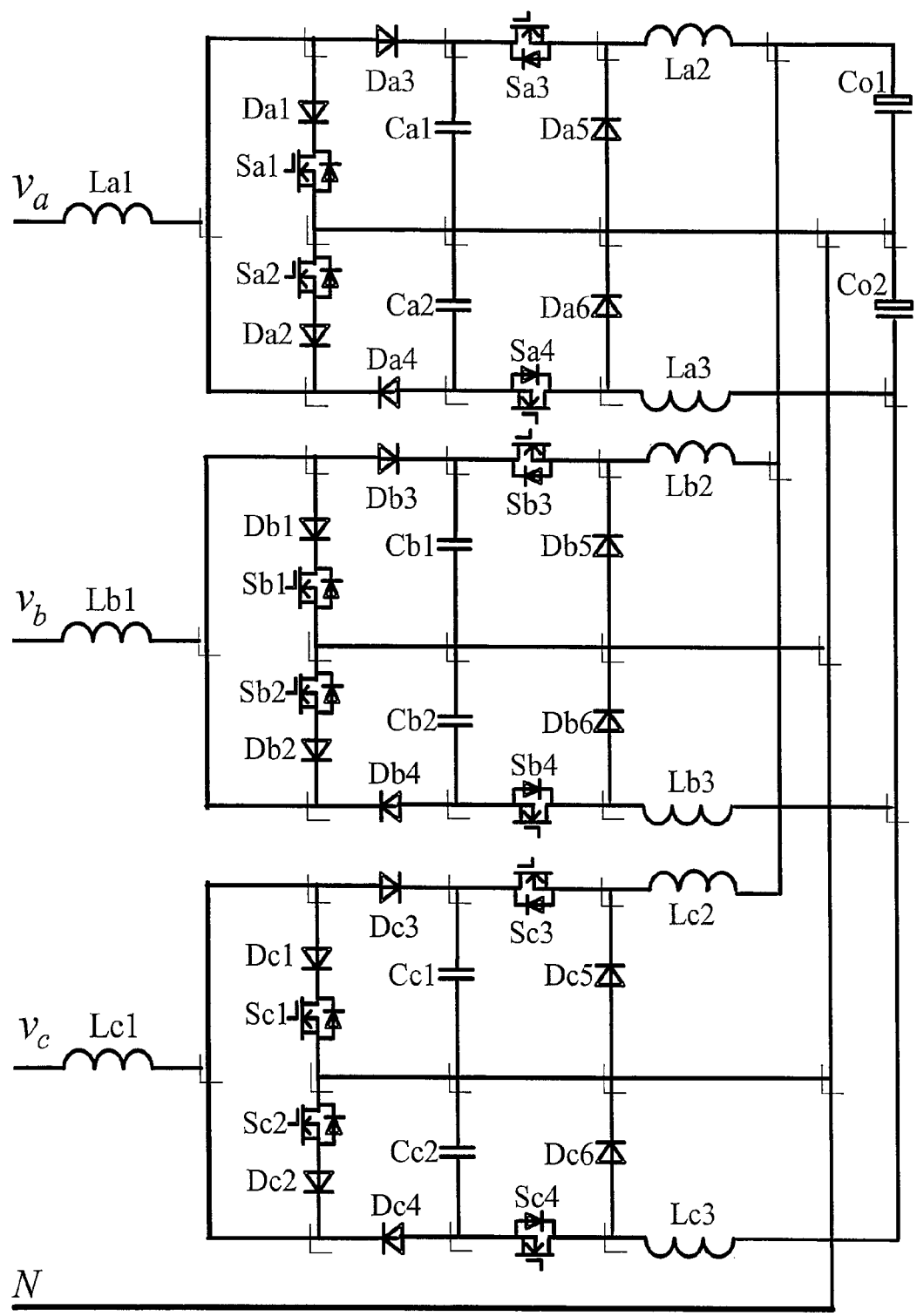
FIG. 6 is a circuit diagram of a second exemplary implementation of a three-phase boost-buck PFC converter of the invention.

A second exemplary implementation of the three-phase boost-buck PFC converter of the invention is as that shown in FIG. 6, in which the inductors La1, Lb1 and Lc1 respectively replace the inductors La1 and La2, Lb1 and Lb2, Lc1 and Lc2 in the circuit of FIG. 4, so that the whole circuit is simplified, and the number of used devices is reduced. A device coupling method is as that shown in FIG. 6. The difference between FIGS. 4 and 6 is that, in the embodiment as shown in FIG. 6, one end of the inductor Lx1 (x=a, b, c) is connected to the input terminal; and another end of the inductor Lx1 is respectively connected to a connection line between the anodes of the diodes Dx1 and Dx3 and a connection line between the cathodes of the diodes Dx2 and Dx4. Moreover, the other parts of the circuit are the same to that shown in FIG. 4.

Figure 7:
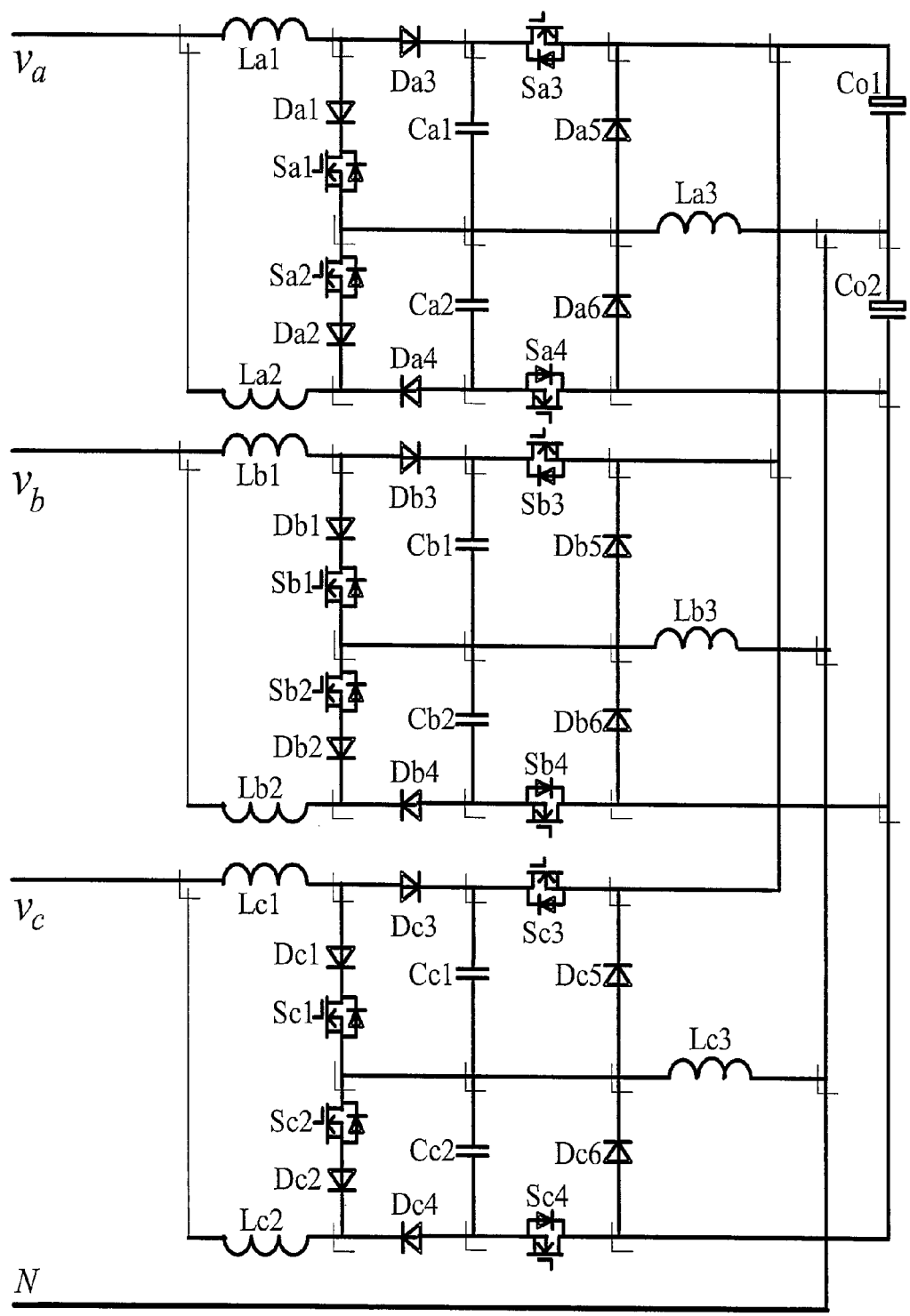
FIG. 7 is a circuit diagram of a third exemplary implementation of a three-phase boost-buck PFC converter of the invention.

A third exemplary implementation of the three-phase boost-buck PFC converter of the invention is as that shown in FIG. 7, in which the inductors La3, Lb3 and Lc3 respectively replace the inductors La3 and La4, Lb3 and Lb4, Lc3 and Lc4 in the circuit of FIG. 4, so that the whole circuit is simplified, and the number of the used devices is reduced. A device coupling method is as that shown in FIG. 7. The difference between FIGS. 4 and 7 is that, in the embodiment as shown in FIG. 7, three connection lines respectively between the switches Sx1 (x=a, b, c) and Sx2, between the filter capacitors Cx1 and Cx2, and between the diodes Dx5 and Dx6 are connected to the neutral point through the inductor Lx3; the cathode of the diode Dx5 is connected to the first output terminal; and the anode of the diode Dx6 is connected to the second output terminal. Moreover, the other parts of the circuit are the same to that shown in FIG. 4.

Figure 8:
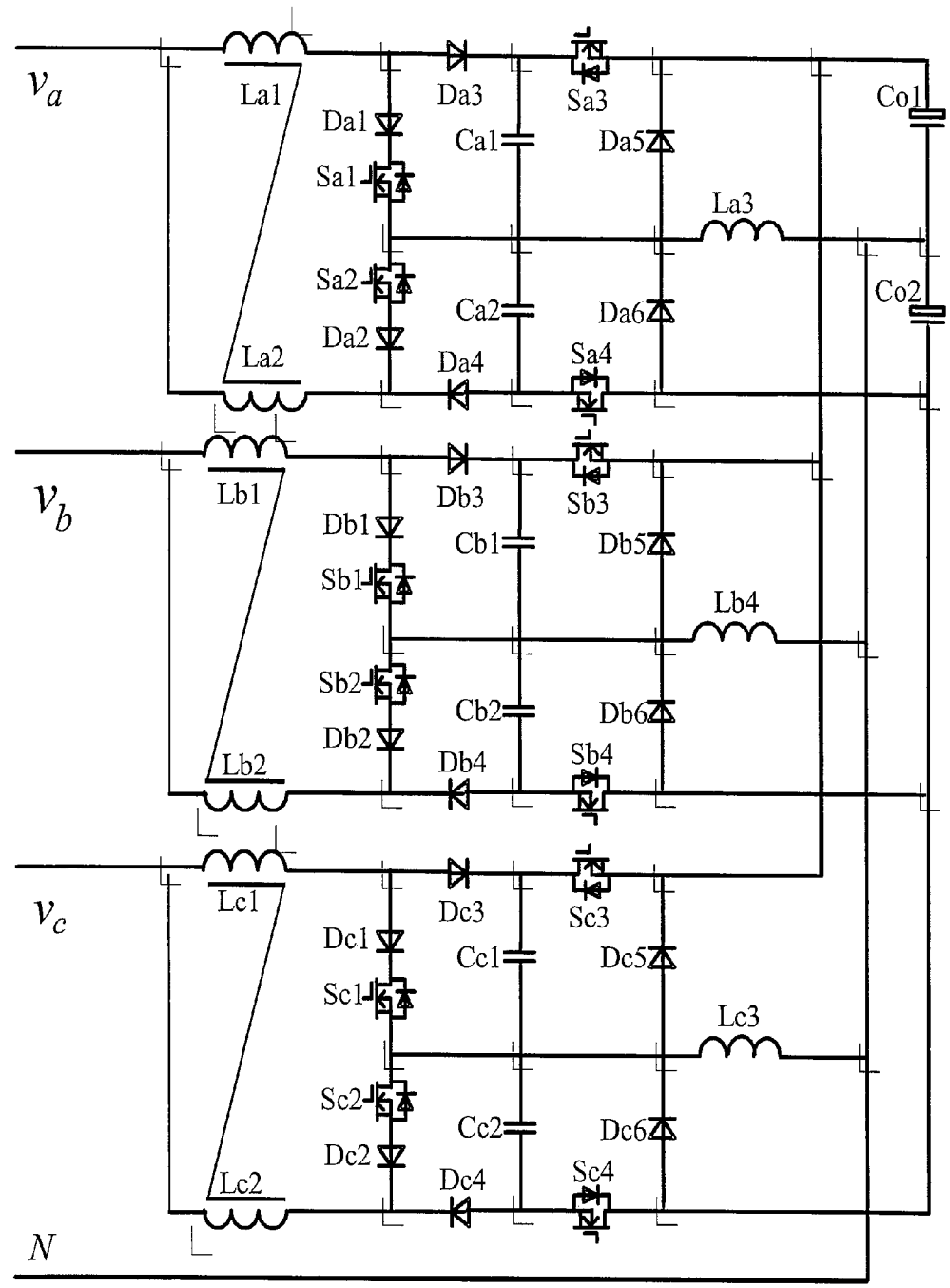
FIG. 8 is a circuit diagram of an improved implementation of the third exemplary implementation of a three-phase boost-buck PFC converter of the invention.

An improved implementation of the first exemplary implementation of the three-phase boost-buck PFC converter is as that shown in FIG. 8, in which the inductors La1 and La2, Lb1 and Lb2, Lc1 and Lc2 are magnetically coupled respectively, i.e. two inductors share a common magnetic core, and the other parts are the same to that shown in FIG. 7.

Figure 9:
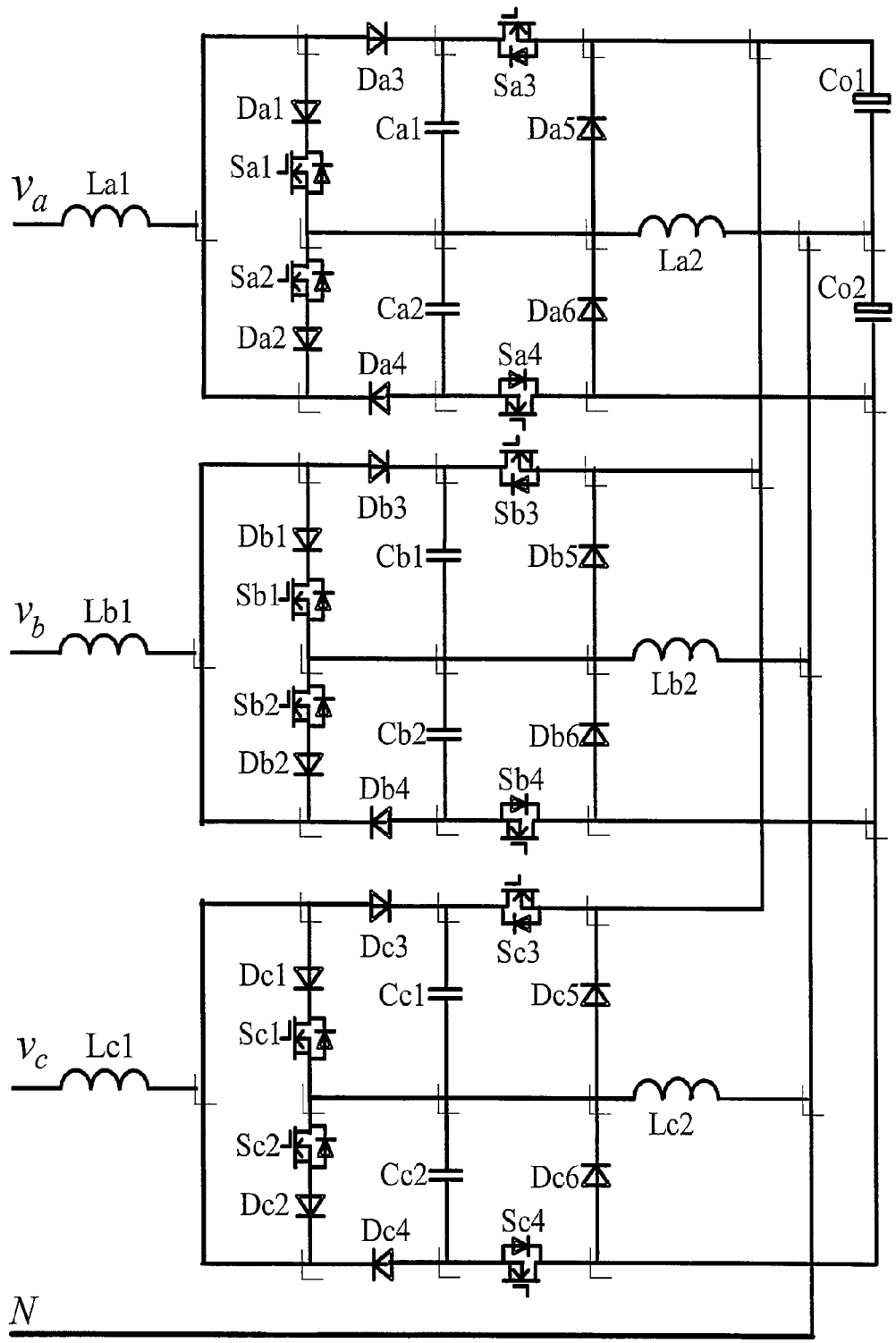
FIG. 9 is a circuit diagram of a fourth exemplary implementation of a three-phase boost-buck PFC converter of the invention.

A fourth exemplary implementation of the three-phase boost-buck PFC converter of the invention is as that shown in FIG. 9, in which the inductors La1, Lb1 and Lc1 respectively replace the inductors La1 and La2, Lb1 and Lb2, Lc1 and Lc2 in the circuit of FIG. 4, and the inductors La2, Lb2 and Lc2 respectively replace the inductors La3 and La4, Lb3 and Lb4, Lc3 and Lc4 in the circuit of FIG. 4, so that the whole circuit is simplified, and the number of used devices is reduced. A device coupling method is as that shown in FIG. 9. The difference between FIGS. 4 and 9 is that, in the embodiment as shown in FIG. 9, one end of the inductor Lx1 (x=a, b, c) is connected to the input terminal; another end of the inductor Lx1 is respectively connected to a connection line between the anodes of the diodes Dx1 and Dx3 and a connection line between the cathodes of the diodes Dx2 and Dx4; three connection lines respectively between the switches Sx1 (x=a, b, c) and Sx2, between the filter capacitors Cx1 and Cx2, and between the diodes Dx5 and Dx6 are connected to the neutral point through the inductor Lx2; the cathode of the diode Dx5 is connected to the first output terminal; and the anode of the diode Dx6 is connected to the second output terminal. Moreover, the other parts of the circuit are the same to that shown in FIG. 4.

Each of the circuits shown in FIGS. 4-9 can be decoupled into three independent single-phase boost-buck PFC converters, so that a single-phase boost-buck PFC converter is obtained, which includes a single-phase boost-buck PFC circuit, a first output capacitor, a second output capacitor and a neutral line; the single-phase boost-buck PFC circuit includes a neutral point, an input terminal, a first output terminal and a second output terminal. One end of the first output capacitor is connected to the neutral point, and another end is connected to the first output terminal. One end of the second output capacitor is connected to the neutral point, and another end is connected to the second output terminal. A second input terminal is connected to the neutral point. The single-phase boost-buck PFC circuit is composed of a front-end boost circuit and a back-end buck circuit connected in cascade, i.e. the single-phase boost-buck PFC circuit is a boos-buck PFC circuit.

Similarly, six exemplary implementations of the single-phase boost-buck PFC circuit are obtained with reference of FIGS. 10-15.

Figure 10:
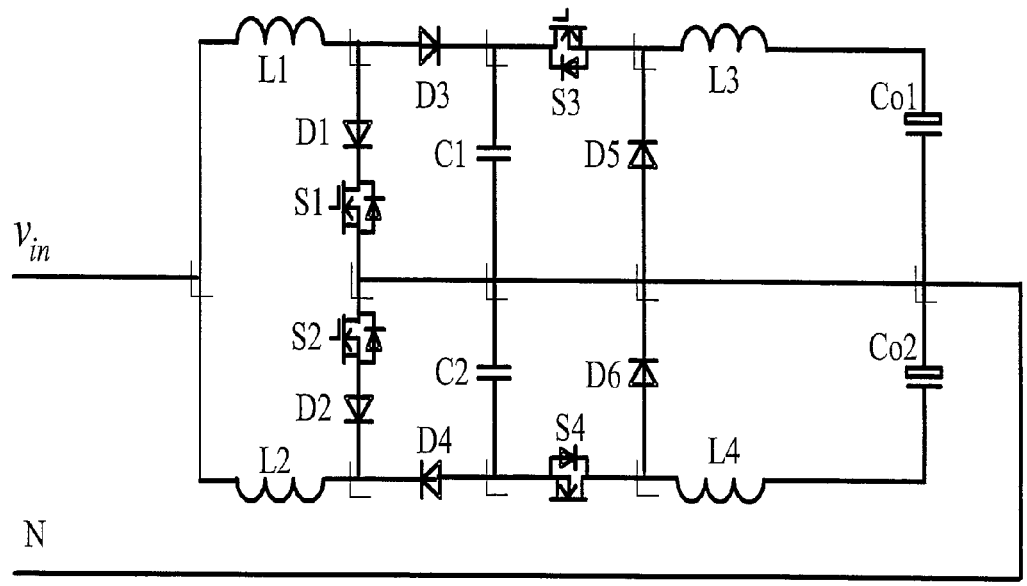
FIG. 10 is a circuit diagram of a first exemplary implementation of a single-phase boost-buck PFC converter of the invention.
Figure 11:
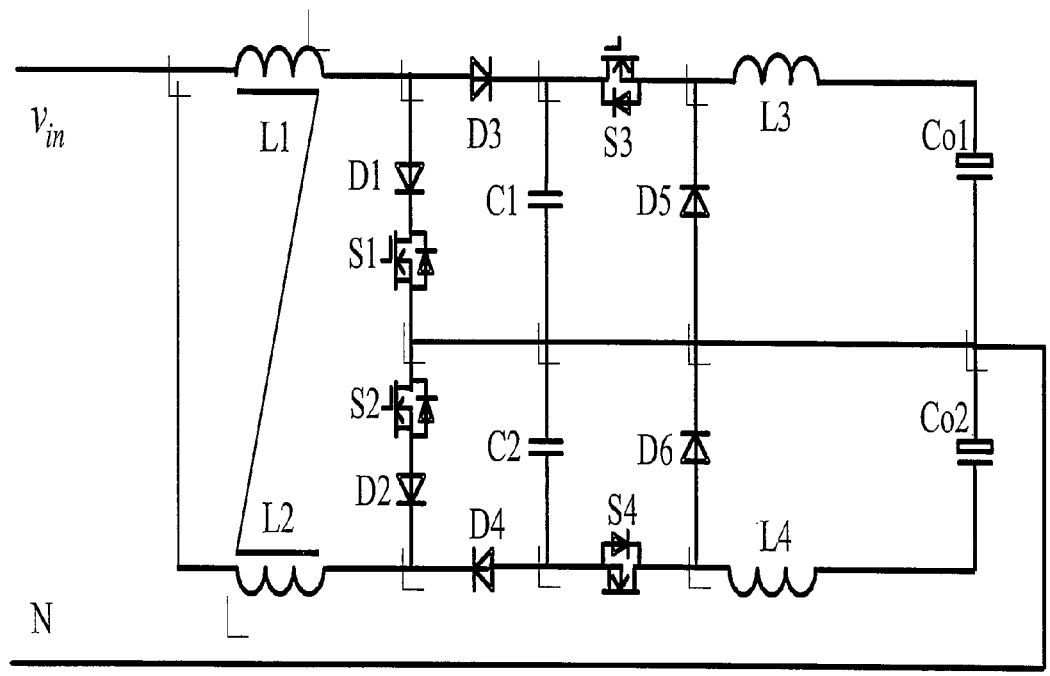
FIG. 11 is a circuit diagram of an improved implementation of the first exemplary implementation of a single-phase boost-buck PFC converter of the invention.
Figure 12:
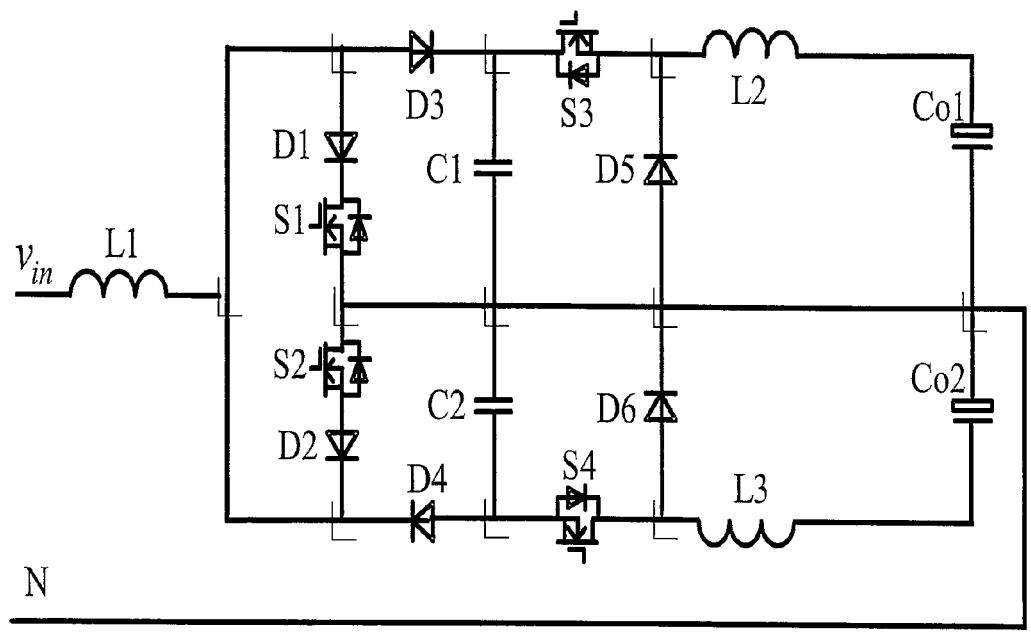
FIG. 12 is a circuit diagram of a second exemplary implementation of a single-phase boost-buck PFC converter of the invention.
Figure 13:
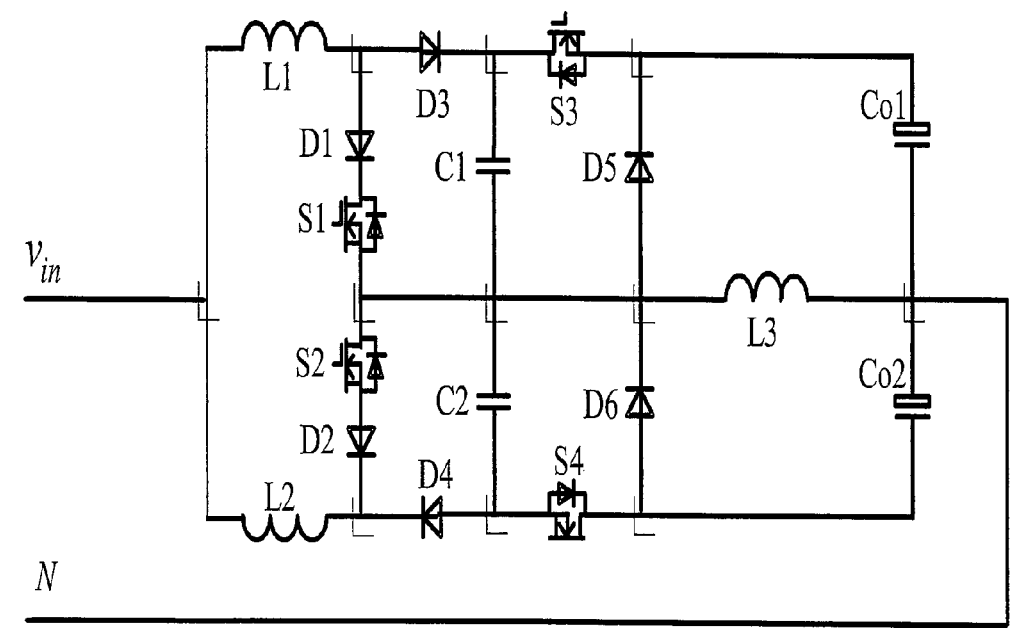
FIG. 13 is a circuit diagram of a third exemplary implementation of a single-phase boost-buck PFC converter of the invention.
Figure 14:
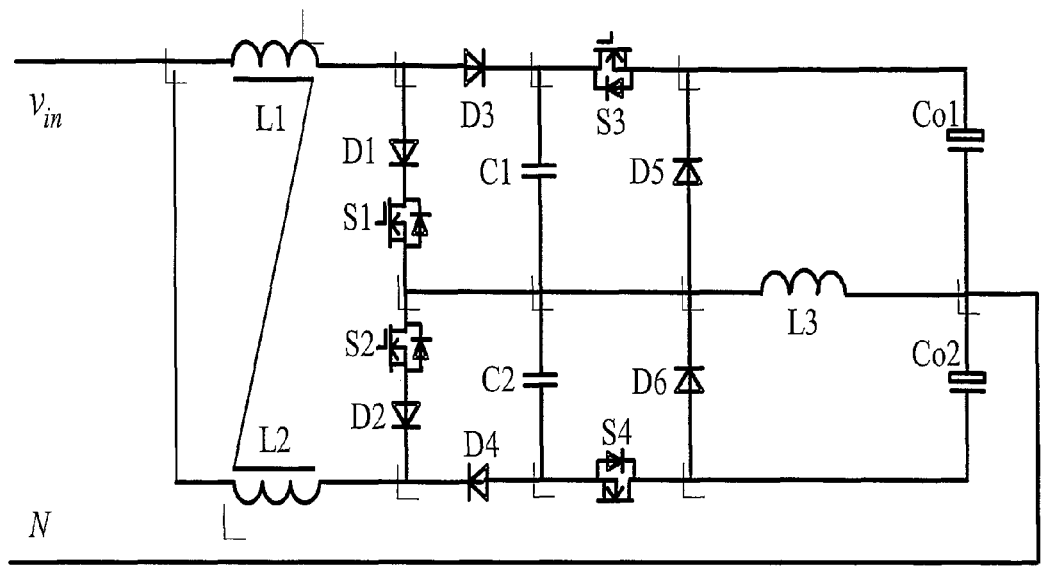
FIG. 14 is a circuit diagram of an improved implementation of the third exemplary implementation of a single-phase boost-buck PFC converter of the invention.
Figure 15:
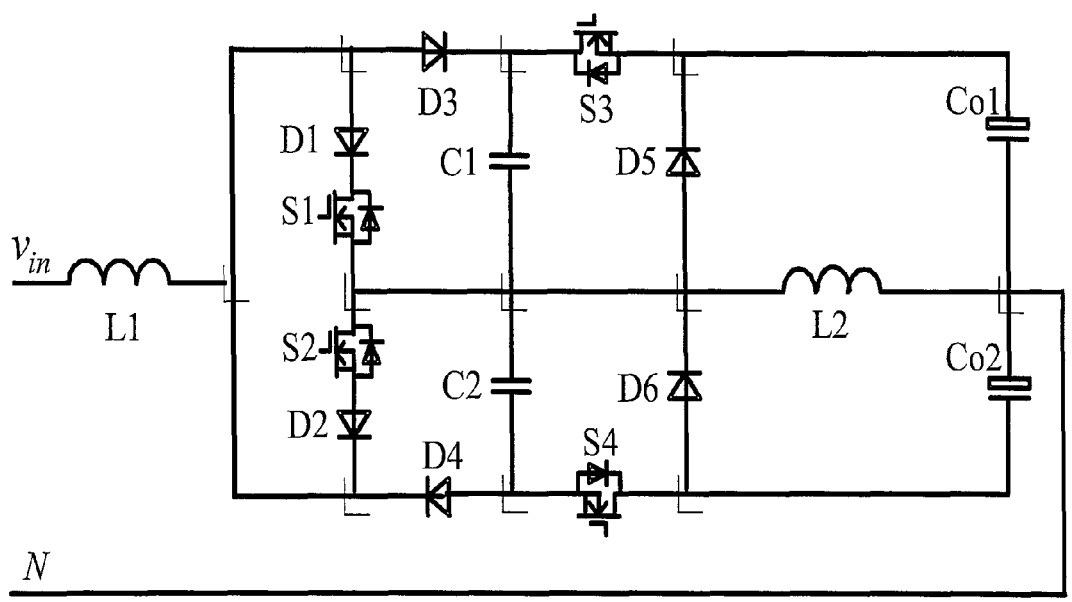
FIG. 15 is a circuit diagram of a fourth exemplary implementation of a single-phase boost-buck PFC converter of the invention.

Since the three-phase boost-buck PFC converter of the invention can be decoupled into three independent single-phase boost-buck PFC converters having the same basic principle and working process, only the single-phase boost-buck PFC converter shown in FIG. 10 is taken as an example to describe the principles and the working processes of the three-phase boost-buck PFC converter and the single-phase boost-buck PFC converter of the invention.

Figure 16:
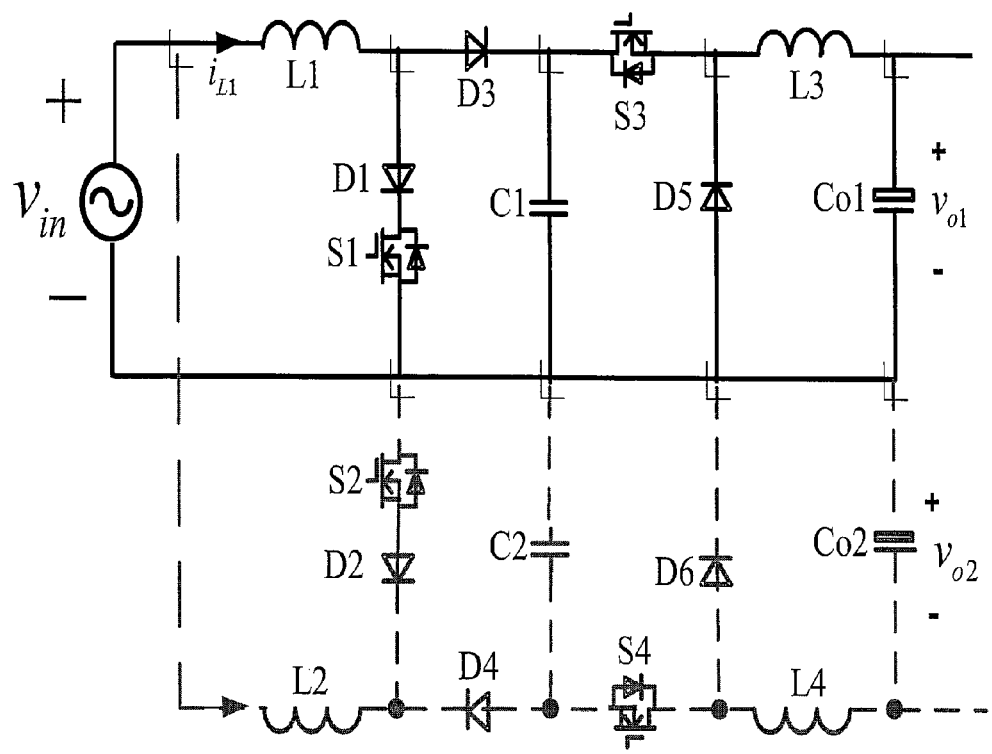
FIG. 16 is a decomposition diagram of the first exemplary implementation of the single-phase boost-buck PFC converter of the invention.

The single-phase boost-buck PFC converter of FIG. 10 can be decomposed into two symmetric branches as that shown in FIG. 16, i.e. an upper branch connected in solid lines and a lower branch connected in dash lines, and the number and types of the devices in the upper and lower branches are totally the same. Taking the upper branch as an example, the upper branch includes two inductors L1 and L3, two switches S1 and S3, three diodes D1, D3 and D5, and two filter capacitors C1 and Co1.

Figure 17:
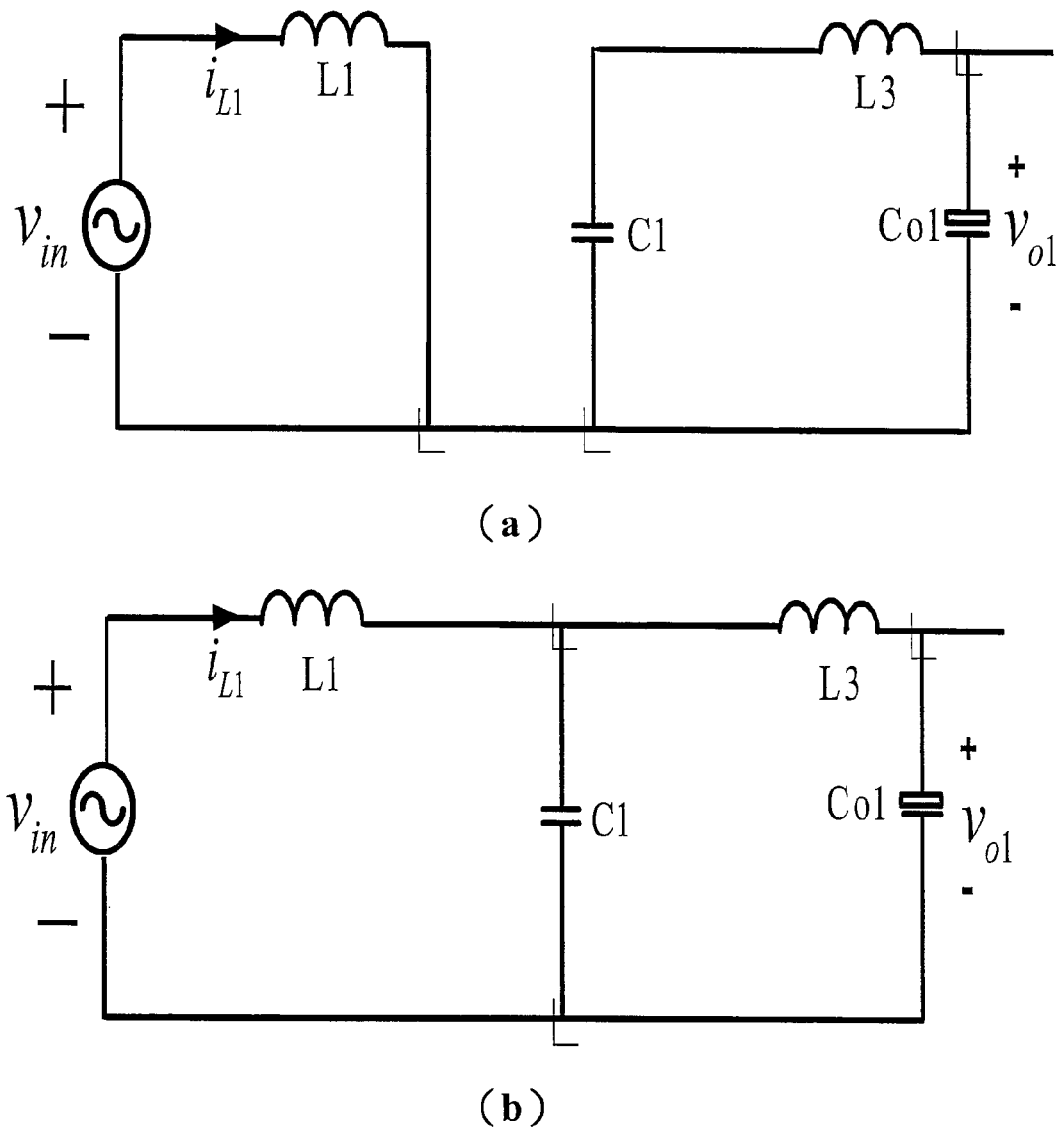
FIG. 17 is a schematic diagram of a single-phase boost-buck PFC converter in a boost mode during a positive half cycle of a power voltage, in which diagram (a) illustrates a working state when a switch S1 is turned on, and diagram (b) illustrates a working state when the switch S1 is turned off.
Figure 18:
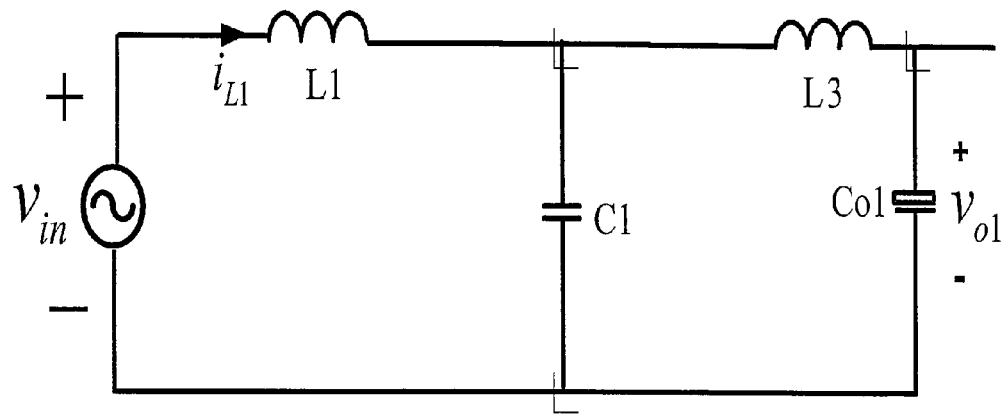
FIG. 18 is a schematic diagram of a single-phase boost-buck PFC converter in a buck mode during a positive half cycle of a power voltage, in which diagram (a) illustrates a working state when a switch S3 is turned on, and diagram (b) illustrates a working state when the switch S3 is turned off.
Figure 18:
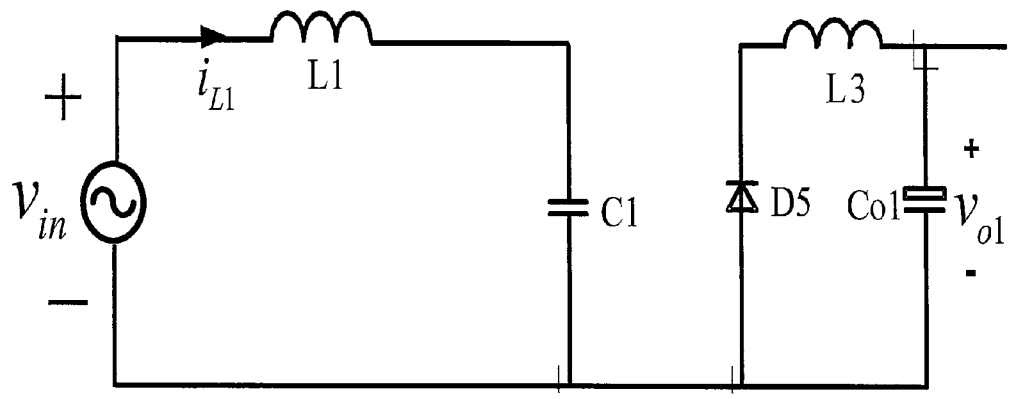

If an input voltage is $v_{in}$, voltages on the output capacitors Co1 and Co2 are respectively $v_{o1}$ and $v_{o2}$, the working process of the converter can be described as follows:

1) when $v_{in}>0$, i.e. within a positive half cycle of the input voltage, the upper branch of the single-phase boost-buck PFC converter is in a working state, and the working state can be described as follows:
   when $v_{in}<v_{o1}$, the upper branch works in a boost mode, and in such phase, the switch S3 is in a constant turn-on state, the diode D5 is in a turn-off state, and the switch S1 is in a pulse width modulation (PWM) switch working state: during a period that the switch S1 is turned on, the inductor L1 stores energy, an inductor current $i_{L1}$ is increased, the diodes D3 and D5 are turned off, and a current path is as that shown in FIG. 17(a); during a period that the switch S1 is turned off, the diode D3 is turned on, the diode D5 is turned off, and a current path is as that shown in FIG. 17(b);
   when $v_{in}>v_{o1}$, the upper branch works in a buck mode, and in such phase, the switch S1 is in a constant turn-off state, the diode D3 is in a constant turn-on state, and the switch S3 is in the PWM switch working state: during a period that the switch S3 is turned on, the AC power directly transmits power to a load side, the diode D5 is turned off, and a current path is as that shown in FIG. 18(a); during a period that the switch S3 is turned off, the inductor L3 is freewheeled through the diode D5, and a current path is as that shown in FIG. 18(b).

Figure 19:
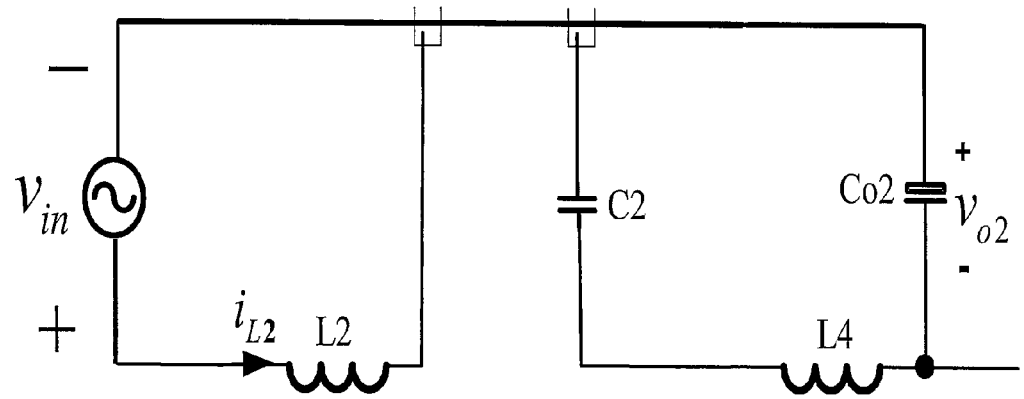
FIG. 19 is a schematic diagram of a single-phase boost-buck PFC converter in a boost mode during a negative half cycle of a power voltage, in which diagram (a) illustrates a working state when a switch S2 is turned on, and diagram (b) illustrates a working state when the switch S2 is turned off.
Figure 19:
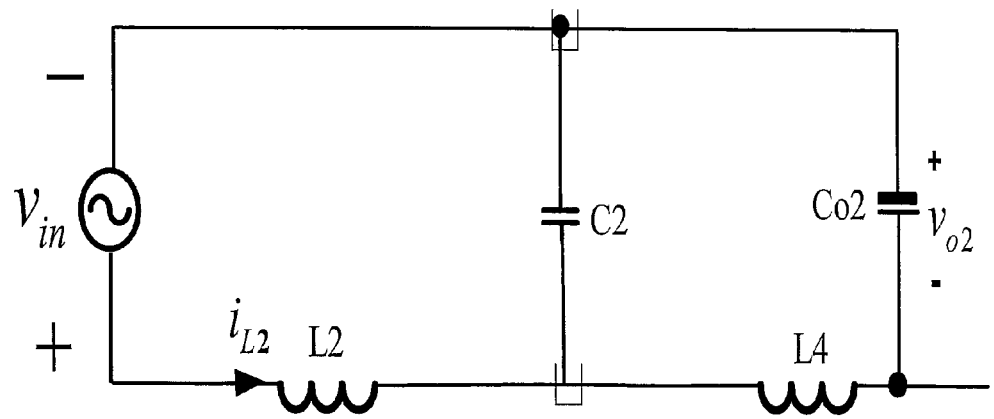
Figure 20:
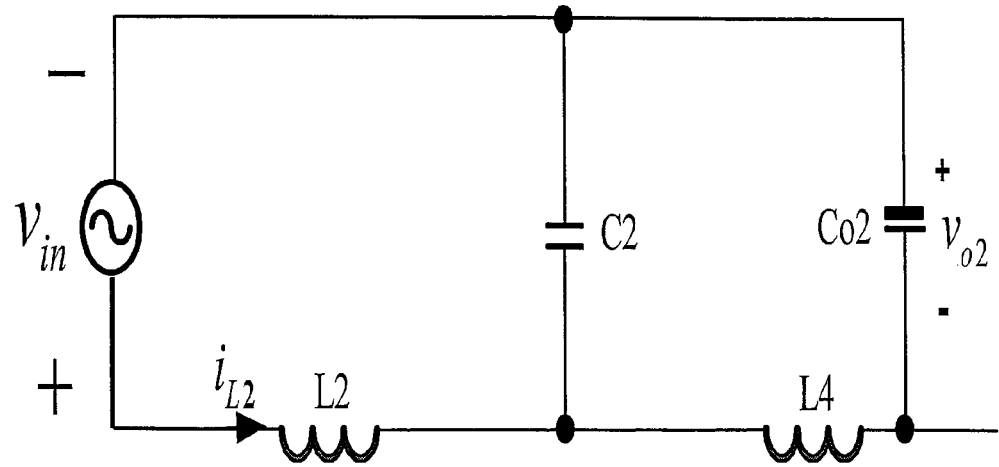
FIG. 20 is a schematic diagram of a single-phase boost-buck PFC converter in a buck mode during a negative half cycle of a power voltage, in which diagram (a) illustrates a working state when a switch S4 is turned on, and diagram (b) illustrates a working state when the switch S4 is turned off.
Figure 20:
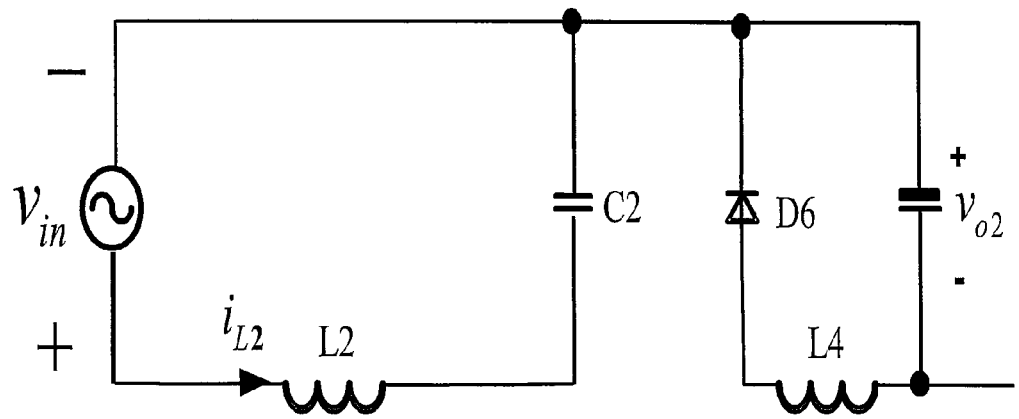

2) when $v_{in}<0$, i.e. within a negative half cycle of the input voltage, the lower branch of the converter is in the working state, and the working state can be described as follows:
   when $v_{in}<v_{o1}$, the lower branch works in the boost mode, and in such phase, the switch S4 is in the constant turn-on state, and the switch S2 is in the PWM switch working state: during a period that the switch S2 is turned on, an inductor current $i_{L2}$ is increased, the diodes D4 and D6 are turned off, and a current path is as that shown in FIG. 19(a); during a period that the switch S2 is turned off, the diode D4 is turned on, the diode D6 is turned off, and a current path is as that shown in FIG. 19(b);
   when $v_{in}>v_{o2}$, the upper branch works in the buck mode, and in such phase, the switch S2 is in the constant turn-off state, and the switch S4 is in the PWM switch working state: during a period that the switch S4 is turned on, the AC power directly transmits power to the load side, an absolute value of the inductor current $I_{L2}$ is increased, the diode D6 is turned off, and a current path is as that shown in FIG. 20(a); during a period that the switch S4 is turned off, the inductor L4 is freewheeled through the diode D6 to charge the output capacitor Co2, and a current path is as that shown in FIG. 20(b).

Figure 21:
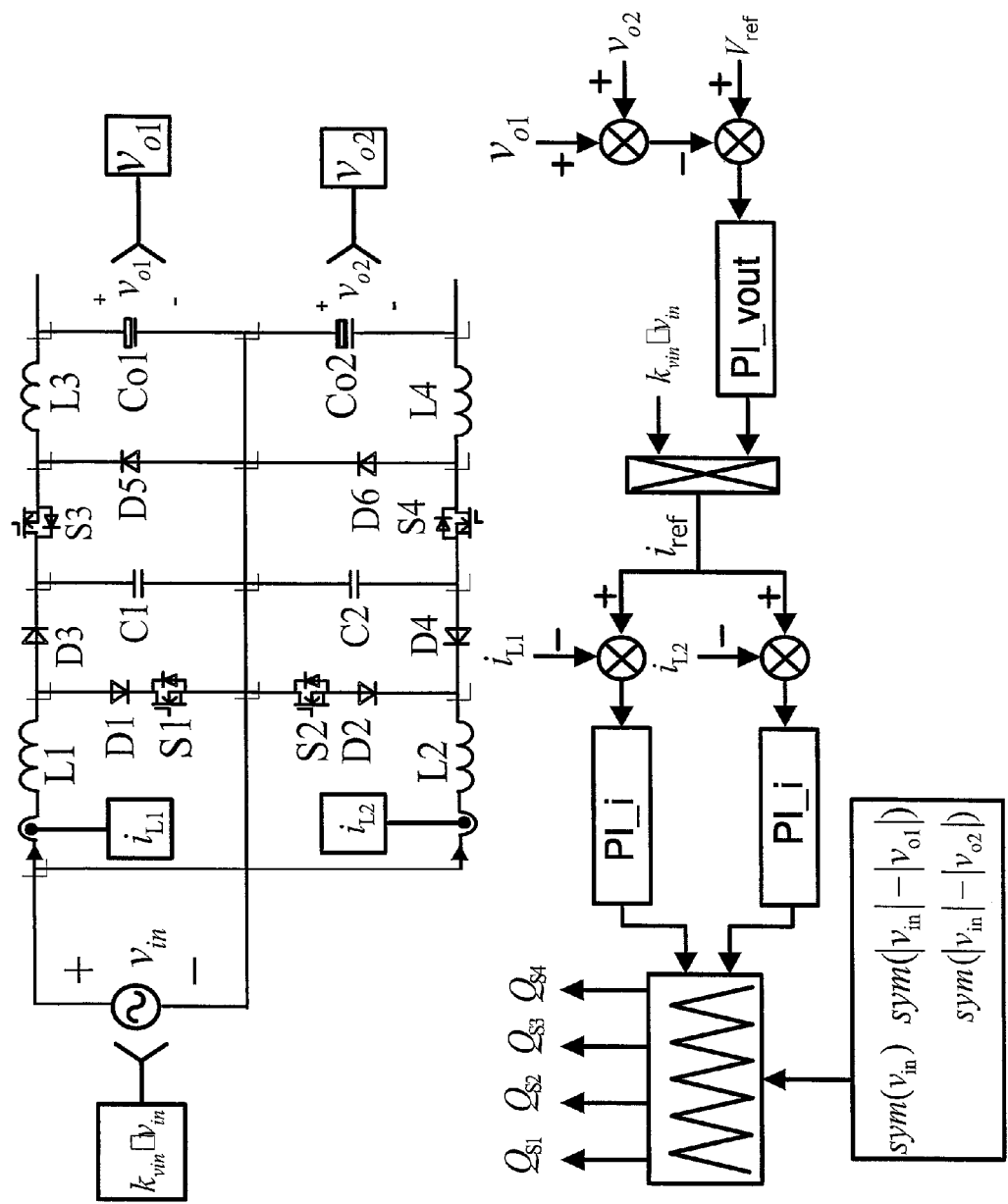
FIG. 21 is a control block diagram of a single-phase boost-buck PFC converter of the invention, in which Qs1-Qs4 are respectively gate driving signals of switches S1-S4.

FIG. 21 is a control block diagram of the single-phase boost-buck PFC converter of FIG. 10, in which a double loop control structure of outer voltage and inner current is used. In order to control the output voltage to a fixed value and implement power factor correction of an input side, the output voltage and the inductor current of the input side are required to be sampled. Moreover, to assist distributing switch control pulses and generate a reference signal of the input current, the power voltage is required to be sampled, and a control principle thereof is as follows.

First, the output voltage is sampled, and a difference between an output voltage reference $v_{ref}$ and an actual output voltage is calculated, and the difference is transmitted to a voltage controller PI_vout, which is generally a proportional-integral controller, i.e. a PI controller. Then, the output voltage of the voltage controller and a sampling value of the input voltage are multiplied to obtain an input current reference signal $i_{ref}$. Then, differences of the current reference and sampling values of the input currents are calculated, and after PI operations, the output of the controller can serve as a modulation wave, and finally the modulation wave and a carrier wave are intersected to produce the control pulses.

Compared to the conventional technique, the three-phase and single-phase boost-buck PFC converters of the invention can effectively improve system efficiency. An A-phase branch of the positive half cycle of the power voltage is taken as an example to compare the three-phase boost-buck PFC converter of the invention (shown in FIG. 4) with the circuit of FIG. 3.

Figure 3:
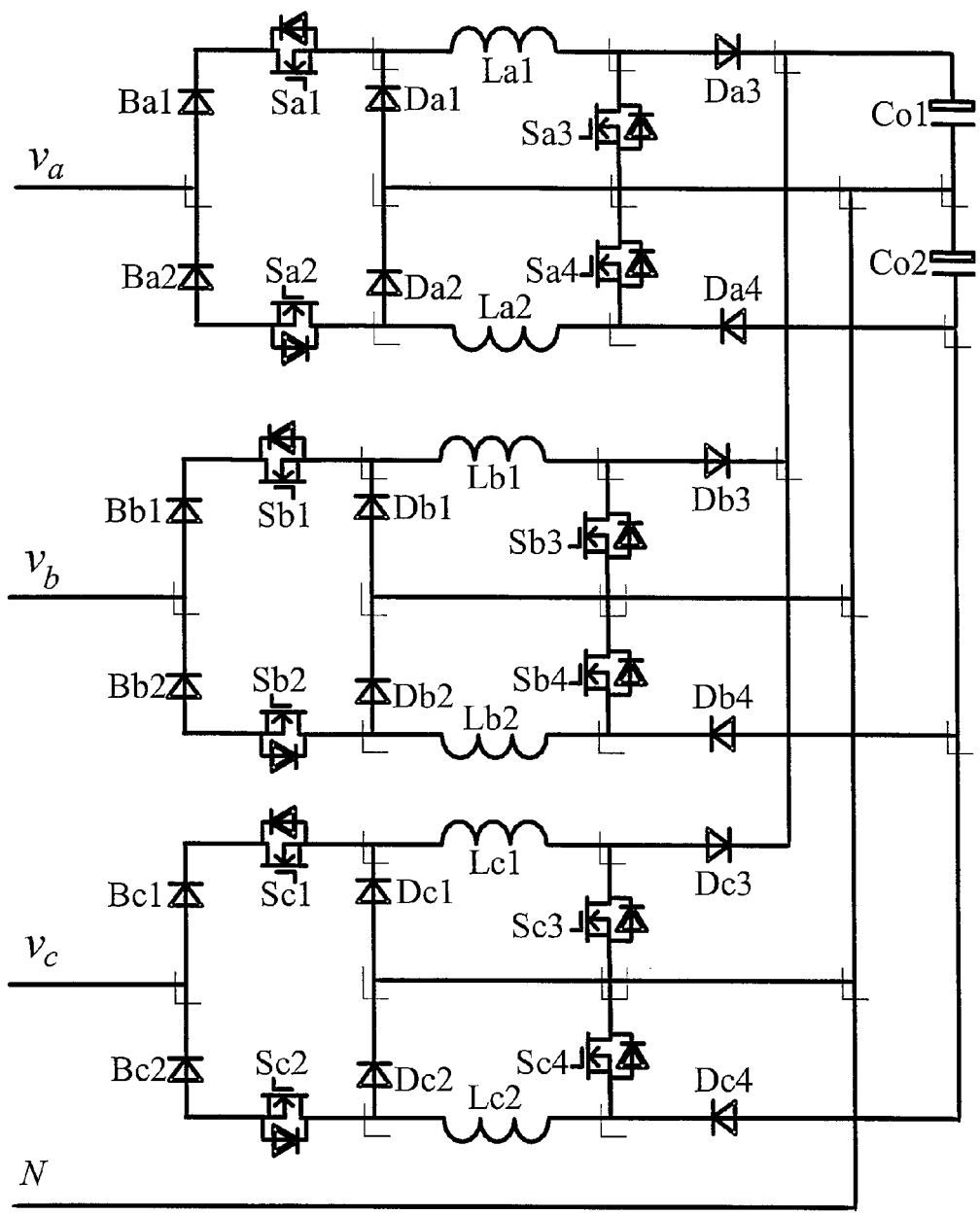
FIG. 3 is a circuit diagram of an existing three-level three phase boost-buck PFC converter of a three-phase four-wire structure.

In case of the boost mode (a switch Sa1 of FIG. 3 is constantly turned on, and the switch Sa3 of FIG. 4 is constantly turned on):

Regarding the circuit of FIG. 3, during a period when a switch Sa3 is turned on, the switches Sa1 and Sa3 and a diode Ba1 have the conduction loss. Regarding the circuit of FIG. 4, during a period when the switch Sa1 is turned on, the switches Sa1 and Sa3 and the diode Da1 have the conduction loss. Therefore, in such phase, switch types and numbers of the switches of the two circuits related to the conduction loss are equivalent, so that the conduction losses thereof are almost equivalent.

Regarding the circuit of FIG. 3, when the switch Sa3 is turned off, the diodes Da1 and Da3 have the conduction loss. Regarding the circuit of FIG. 4, when the switch Sa1 is turned off, the diode Da3 and the switch Sa3 have the conduction loss. Therefore, in such phase, although the number of the switch devices of the two circuits related to the conduction loss are equivalent, in the circuit of FIG. 4, one switch and one diode are related to the conduction loss, and in the circuit topology of FIG. 3, two diodes are related to the conduction loss. Generally, an on-state resistance of the diode is greater than an on-state resistance of the switch, so that in case that the same current flows there through, the conduction loss of the diode is greater than that of the switch. Therefore, the circuit of FIG. 4 may have higher efficiency in such phase.

In case of the buck mode (the switch Sa3 of FIG. 3 is constantly turned off, and the switch Sa1 of FIG. 4 is constantly turned off):

Regarding the circuit of FIG. 3, during a period when the switch Sa1 is turned on, the switch Sa1 and the diodes Ba1 and Da3 have the conduction loss. Regarding the circuit of FIG. 4, during a period when the switch Sa3 is turned on, only the switch Sa3 and the diode Da3 have the conduction loss. Therefore, in such phase, compared to the circuit of FIG. 3, the circuit topology of FIG. 4 is reduced by the conduction loss of one diode, by which the system efficiency is improved.

Regarding the circuit of FIG. 3, during a period when the switch Sa1 is turned off, the diodes Da1 and Da3 have the conduction loss. Regarding the circuit of FIG. 4, during a period when the switch Sa3 is turned off, the diodes Da3 and Da5 have the conduction loss. Therefore, in such phase, switch types and numbers of the switch devices of the two circuits related to the conduction loss are equivalent, so that the conduction losses thereof are almost equivalent.

According to the above analysis, it is known that regardless of the boost mode or the buck mode, the circuit topology of FIG. 4 has higher efficiency, which is very important in a large-capacity UPS power system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-phase boost-buck power factor correction (PFC) converter, comprising:

a first, a second and a third single-phase boost-buck PFC circuits, respectively receiving one-phase voltage of three-phase voltages, and respectively comprising a neutral point, an input terminal, a first output terminal and a second output terminal;

a first output capacitor, having one end connected to the three neutral points, and another end connected to the three first output terminals;

a second output capacitor, having one end connected to the three neutral points, and another end connected to the three second output terminals;

a neutral line, wherein the three neutral points are connected to the neutral line, wherein the first, the second and the third single-phase boost-buck PFC circuits are respectively composed of two single-phase boost-buck converters independently working in a positive and a negative half cycle of an input voltage, and the two single-phase boost-buck converters are connected in parallel at an input side, and are connected in series at an output side, and each of the single-phase boost-buck converters is composed of a front-end boost circuit and a back-end buck circuit connected in cascade.

2. The three-phase boost-buck PFC converter as claimed in claim 1, wherein each of the first, the second and the third single-phase boost-buck PFC circuits comprises:

a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;

a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;

a first to a fourth inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the first output terminal, another end of the third inductor is connected to the first terminal of the third switch, one end of the fourth inductor is connected to the second output terminal, and another end of the fourth inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

3. The three-phase boost-buck PFC converter as claimed in claim 2, wherein the first inductor and the second inductor are magnetically coupled.

4. The three-phase boost-buck PFC converter as claimed in claim 1, wherein each of the first, the second and the third single-phase boost-buck PFC circuits comprises:
  a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;
  a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;
  a first to a third inductors, wherein one end of the first inductor is connected to the input terminal, another end of the first inductor is respectively connected to a connection line between the anodes of the first diode and the third diode and a connection line between the cathodes of the second diode and the fourth diode, one end of the second inductor is connected to the first output terminal, another end of the second inductor is connected to the first terminal of the third switch, one end of the third inductor is connected to the second output terminal, and another end of the third inductor is connected to the second terminal of the fourth switch; and
  a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

5. The three-phase boost-buck PFC converter as claimed in claim 1, wherein each of the first, the second and the third single-phase boost-buck PFC circuits comprises:
  a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;
  a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;
  a first to a third inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the neutral point, and another end of the third inductor is connected to a connection line between the anode of the fifth diode and the cathode of the sixth diode and a connection line between the first terminal of the first switch and the second terminal of the second switch; and
  a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

6. The three-phase boost-buck PFC converter as claimed in claim 5, wherein the first inductor and the second inductor are magnetically coupled.

7. The three-phase boost-buck PFC converter as claimed in claim 1, wherein each of the first, the second and the third single-phase boost-buck PFC circuits comprises:
  a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;
  a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;
  a first inductor and a second inductor, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the neutral point, and another end of the second inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

8. A single-phase boost-buck power factor correction (PFC) converter, comprising:
 a single-phase boost-buck PFC circuit, comprising a neutral point, an input terminal, a first output terminal and a second output terminal;
 a first output capacitor, having one end connected to the neutral point, and another end connected to the first output terminal;
 a second output capacitor, having one end connected to the neutral point, and another end connected to the second output terminal;
 a neutral line, wherein a second input terminal is connected to the neutral point,
 wherein the single-phase boost-buck PFC circuit is composed of two single-phase boost-buck converters independently working in a positive and a negative half cycle of an input voltage, and the two single-phase boost-buck converters are connected in parallel at an input side, and are connected in series at an output side, and each of the single-phase boost-buck converters is composed of a front-end boost circuit and a back-end buck circuit connected in cascade.

9. The single-phase boost-buck PFC converter as claimed in claim 8, wherein the single-phase boost-buck PFC circuit comprises:
 a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;
 a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;
 a first to a fourth inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the first output terminal, another end of the third inductor is connected to the first terminal of the third switch, one end of the fourth inductor is connected to the second output terminal, and another end of the fourth inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

10. The single-phase boost-buck PFC converter as claimed in claim 9, wherein the first inductor and the second inductor are magnetically coupled.

11. The single-phase boost-buck PFC converter as claimed in claim 8, wherein the single-phase boost-buck PFC circuit comprises:
 a first to a sixth diodes, wherein an anode of the first diode is connected to an anode of the third diode, a cathode of the second diode is connected to a cathode of the fourth diode, and a cathode of the sixth diode and an anode of the fifth diode are connected to the neutral point;
 a first to a fourth switches, each of the switches having a first terminal and a second terminal, wherein the first terminal of the first switch and the second terminal of the second switch are connected to the neutral point, the second terminal of the first switch is connected to a cathode of the first diode, the first terminal of the second switch is connected to an anode of the second diode, the first terminal of the third switch is connected to a cathode of the fifth diode, the second terminal of the third switch is connected to a cathode of the third diode, the first terminal of the fourth switch is connected to an anode of the fourth diode, and the second terminal of the fourth switch is connected to an anode of the sixth diode;
 a first to a third inductors, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the first output terminal, another end of the second inductor is connected to the first terminal of the third switch, one end of the third inductor is connected to the second output terminal, and another end of the third inductor is connected to the second terminal of the fourth switch; and a first filter capacitor and a second filter capacitor, wherein one end of the first filter capacitor is connected to a connection line between the second terminal of the third switch and the cathode of the third diode, another end of the first filter capacitor is connected to the neutral point, one end of the second filter capacitor is connected to a connection line between the first terminal of the fourth switch and the anode of the fourth diode, and another end of the second filter capacitor is connected to the neutral point.

12. The single-phase boost-buck PFC converter as claimed in claim 8, wherein the single-phase boost-buck PFC circuit comprises:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first to a third inductors, wherein one end of the first inductor is connected to the input terminal, another end of the first inductor is connected to a connection line between the anode of the first diode and the anode of the third diode, one end of the second inductor is connected to the input terminal, another end of the second inductor is connected to a connection line between the cathode of the second diode and the cathode of the fourth diode, one end of the third inductor is connected to the neutral point, and another end of the third inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

13. The single-phase boost-buck PFC converter as claimed in claim 12, wherein the first inductor and the second inductor are magnetically coupled.

14. The single-phase boost-buck PFC converter as claimed in claim 8, wherein the single-phase boost-buck PFC circuit comprises:

a first to a sixth diodes, wherein an anode of the first diode is connected to an anode of the third diode, a cathode of the second diode is connected to a cathode of the fourth diode, a cathode of the fifth diode is connected to the first output terminal, an anode of the sixth diode is connected to the second output terminal, and an anode of the fifth diode is connected to a cathode of the sixth diode;

a first to a fourth switches, each of the switches having a first terminal and a second terminal, wherein the first terminal of the first switch is connected to the second terminal of the second switch, the second terminal of the first switch is connected to a cathode of the first diode, the first terminal of the second switch is connected to an anode of the second diode, the first terminal of the third switch is connected to a connection line between the cathode of the fifth diode and the first output terminal, the second terminal of the third switch is connected to a cathode of the third diode, the first terminal of the fourth switch is connected to an anode of the fourth diode, and the second terminal of the fourth switch is connected to a connection line between the anode of the sixth diode and the second output terminal;

a first inductor and a second inductor, wherein one end of the first inductor is connected to the input terminal, another end of the first inductor is respectively connected to a connection line between the anodes of the first diode and the third diode, and a connection line between the cathodes of the second diode and the fourth diode, one end of the second inductor is connected to the neutral point, and another end of the second inductor is connected to a connection line between the anode of the fifth diode and the cathode of the sixth diode and a connection line between the first terminal of the first switch and the second terminal of the second switch; and a first filter capacitor and a second filter capacitor, wherein one end of the first filter capacitor is connected to a connection line between the second terminal of the third switch and the cathode of the third diode, another end of the first filter capacitor is connected to the connection line between the anode of the fifth diode and the cathode of the sixth diode, one end of the second filter capacitor is connected to a connection line between the first terminal of the fourth switch and the anode of the fourth diode, and another end of the second filter capacitor is connected to the connection line between the anode of the fifth diode and the cathode of the sixth diode.

* * * * *